April 21, 1970 — L. E. SEIDEL — 3,507,511
STEERING MECHANISM FOR VEHICLES
Filed June 25, 1968
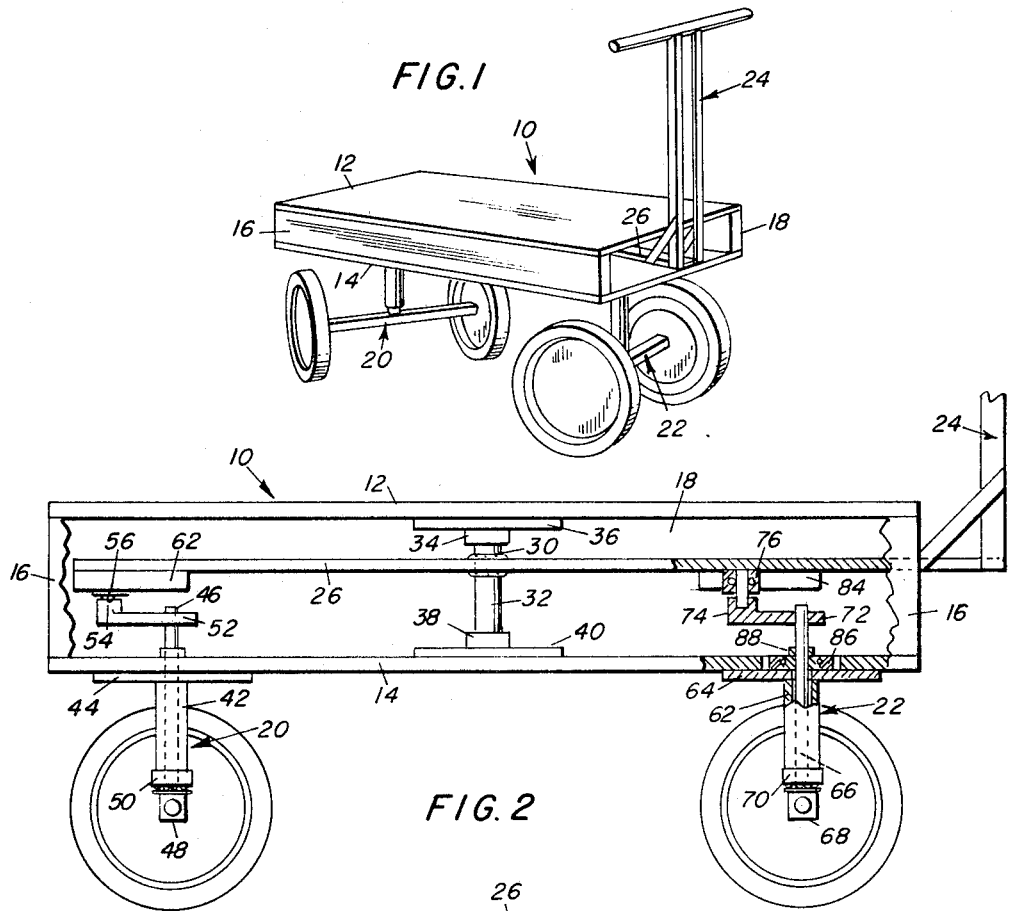
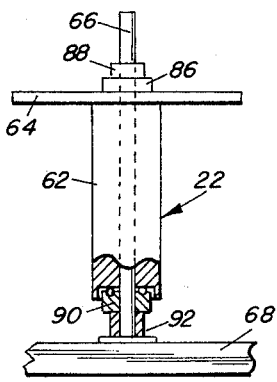
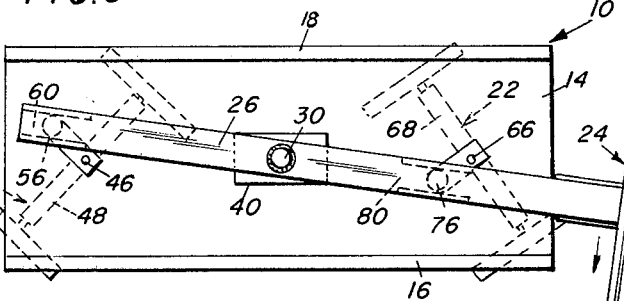
INVENTOR
LLOYD E. SEIDEL
BY Beale and Jones
ATTORNEYS

United States Patent Office 3,507,511
Patented Apr. 21, 1970

3,507,511
STEERING MECHANISM FOR VEHICLES
Lloyd E. Seidel, Rte. 3, Georgetown, Ohio 45121
Filed June 25, 1968, Ser. No. 739,685
Int. Cl. B62b *3/00*
U.S. Cl. 280—47.11
10 Claims

ABSTRACT OF THE DISCLOSURE

A steering mechanism for a wagon-like vehicle is disclosed which permits a short turning radius for great maneuverability. The mechanism provides four wheel steering control by means of two oppositely swinging axles. The mechanism includes a pivot bar having two channels, one on each side of and spaced from the pivot point. Each axle is connected through a rotatable steering shaft to a corresponding steering arm, and each steering arm includes at its outermost end a roller adapted for reception in a corresponding guide channel, whereby pivotal motion of the pivot bar causes the two steering arms to rotate about their corresponding steering shafts in opposite directions, thereby causing the axles to turn in opposite directions. Steerage of the vehicle is thus accomplished by movement of the pivot bar about its pivot point.

Field of the invention

The present invention relates, in general, to a wagon-like vehicle intended for use with non-ambulatory patients, and more particularly to the running gear for such a vehicle wherein a short turning radius is obtained by a four wheel steering mechanism which causes the two axles of the vehicle to swing in opposite directions with operation of the steering mechanism.

Description of the prior art

At the present time there exists in hospitals, nursing homes and in private homes a serious need for vehicles which may be used to comfortably and conveniently transport patients who are unable to stand or walk but who are sufficiently well that they should not be required to remain in bed. Such is the case in particular with patients confined within heavy casts, particularly casts of the hips and legs.

Not only must such vehicles be comfortable for the patient, for normally he will spend a considerable amount of time in such a vehicle, but they must be easily maneuverable. This latter requirement is particularly important when a patient is being cared for in a private residence where the rooms are smaller and the passageways narrower than is the case in most hospitals. A vehicle of the type to which the present invention is particularly applicable is illustrated and described in my prior application Ser. No. 584,256, filed Oct. 4, 1966 (now Patent No. 3,398,-971), which application is copending with the present application. This prior application solves many of the problems of the prior art while providing a vehicle having a steering mechanism which is easily operable and does not add appreciably to the overall length of the vehicle.

The present invention is an improvement of the steering mechanism of my prior application, and has as its objects the provision of a more rigid and stable assembly of the chassis, and the elimination of a number of component parts. Thus, the improved steering mechanism provides a simpler and sturdier steering mechanism which provides easy maneuverability in wagon-like vehicles.

Summary of the invention

The present invention provides, in a wagon-like vehicle, and particularly in a vehicle of the type described in my aforementioned copending patent application, a steering mechanism which comprises a pivot bar extending generally longitudinally of the vehicle, with one end of the bar extending silghtly beyond the end of the vehicle body. The pivot bar is mounted approximately at the center of the vehicle and includes at spaced positions on either side of the pivot point a pair of guide channels. The vehicle includes two spaced axles each of which is mounted at the bottom of a vertical steering shaft, the upper end of which carries a steering arm. The steering arms extend parallel to and slightly below the pivot bar when the axles are aligned for straight-line motion of the vehicle, the arms extending from their corresponding shafts toward the same end of the vehicle. The ends of the steering arms carry roller means adapted to fit into corresponding guide channels on the pivot bar, whereby rotation of the pivot bar causes the axles to turn in opposite directions. The end of the pivot bar which extends beyond the vehicle body carries a pushing and steering handle by means of which the motion of the vehicle may be controlled.

Brief description of the drawing

The novel features which are characteristic of the invention are set forth with particularity in the appended claims, but the various objects and features of the invention will be understood more clearly and fully from the following detailed description of a preferred embodiment thereof, taken in conjunction with the accompanying drawings, in which:

FIG. 1 is a perspective view of a vehicle utilizing the steering mechanism of the preesnt invention;

FIG. 2 is a cross sectional view of the vehicle of FIG. 1;

FIG. 3 is a bottom view of the pivot bar used in the subject steering mechanism;

FIG. 4 is a front view of an axle assembly adapted for use in the subject steering mechanism; and FIG. 5 is a top view of the vehicle of FIG. 1 with the upper platform removed.

DESCRIPTION OF PREFERRED EMBODIMENTS

Turning now to a detailed consideration of the drawings, FIG. 1 illustrates in perspective view a wagon-like vehicle in accordance with the present invention. The wagon is illustrated as having a body portion 10 comprised of an upper platform 12, and a lower platform 14 held in spaced relation by side walls 16 and 18. A pair of spaced axle assemblies 20 and 22 support the vehicle on corresponding wheels. The vehicle is propelled by a handle 24 mounted at one end of the vehicle on a pivot bar 26 which protrudes from within the body portion 10. The handle portion 24 not only permits the vehicle to be pushed, but controls the steering mechanism of the vehicle, whereby movement of the handle to one side of the body portion or to the other causes the axle assemblies 20 and 22 to swing in opposite directions, thereby providing a highly maneuverable vehicle.

It will be apparent that although the vehicle as illustrated has a wagon-like structure, numerous modifications and variations in the body structure may be provided, all of which may utilize the steering mechanism of the invention. For example, the invalid bed described in my above-identified copending application may easily be adapted to the vehicle illustrated in FIG. 1, merely by mounting the invalid bed portion on the upper platform 12.

The side view of FIG. 2 illustrates the manner in which pivot bar 26 is mounted within body portion 10 to control the front and rear axle assemblies 20 and 22. The front axle 20 is shown in side view, with one of the wheels removed, while the rear axle 22 is shown in section. The side wall 16 of the body portion is also removed for visibility of the interior of the body. As illustrated, the body portion is constructed of wood, although other materials may of course be used.

The pivot bar 26 extends longitudinally through the body 10, and is pivotally mounted between the top and bottom platforms 12 and 14 by means of upper and lower pivot pins 30 and 32. The upper pivot pin 30 is adapted to be received in a socket 34 carried by an upper pivot plate 36 which is fastened to upper platform 12 by means of screws, bolts or the like. The end of pivot pin 30 carries a sealed ball bearing assembly (not shown) which is received in socket 34 and permits easy relative rotation between pivot bar 26 and upper platform 12. Similarly, lower pivot pin 32 carries a sealed ball bearing assembly (not shown) which is adapted to be received in a socket 38 carried by a lower pivot plate 40. Plate 40 is mounted on the lower platform 14 in any suitable manner, as by screws or bolts. Pivot plates 36 and 40 are vertically aligned and are located at the approximate center of the vehicle, approximately midway between the axle assemblies 20 and 22.

The forward axle assembly 20 comprises a support housing 42 and a mounting plate 44 by means of which the axle assembly is attached to the lower platform 14. A steering shaft 46 passes through the support housing 42 and is welded or otherwise affixed to the forward axle 48. Thrust bearing assembly 50 may be interposed between the support housing and the axle to permit easy relative rotation of the axle about the axis defined by steering shaft 46. The upper end of shaft 46 carries a steering arm 52 which extends generally at right angles to shaft 46 and is perpendicular to the forward axle 48. The steering arm is affixed to the steering shaft by means of a key, spline, set screw or the like, whereby movement of the steering arm 52 rotates steering shaft 46 to swing axle 48 about the axis defined by shaft 46. The outer end 54 of steering arm 52 is adapted to carry a sealed ball bearing assembly 56 which extends upwardly into a guide channel 60 (FIG. 3) formed on the lower surface of pivot bar 26, the channel being formed by depending side walls 62 and 64. The side walls of the channel exert by way of steering arm 52 rotational forces on steering shaft 46 when pivot bar 26 is rotated about the axis defined by its pivot pins 30 and 32. As the steering arm turns, ball bearing assembly 56 moves longitudinally in the channel 60, the ball bearings permitting easy motion thereof to allow easier steering of the vehicle.

The cross sectional view of axle assembly 22 illustrates in further detail the structure of this embodiment. A support housing 62 and mounting plate 64 provide support for the steering shaft 66 of the rear axle 68 for rotation therewith, and thrust bearing 70 supports the axle and permits its easy rotation. The upper end of steering shaft 66 carries a steering arm 72 which is affixed to the steering shaft for rotation therewith. The outer end 74 of the steering arm carries a ball bearing assembly 76 which is adapted for reception in a second guide channel 80 carried on the lower surface of pivot bar 26. Channel 80 is formed by a pair of side walls 82 and 84 which function in the same manner as the side walls of corresponding channel 60.

There is illustrated at the upper end of axle assembly 22 a further bearing assembly 86 which serves to support the upper end of shaft 66, holding it in alignment with support housing 62 and permitting easy rotation with respect to the housing and the vehicle body. The axle and bearing assembly is held in its assembled condition by means of a retaining bushing 88 which is held in place on the shaft by a suitable means such as a set screw. Axle assembly 20 includes a similar upper bearing, which is not illustrated in the side view.

FIG. 4 is a front view of a modified form of the axle assemblies used in the present invention. The illustration is of a modification of assembly 22, and corresponding elements carry corresponding numbers. The primary difference between this assembly and that of FIG. 2 lies in the arrangement of the thrust bearing. In this case, thrust bearing 90 surrounds shaft 66 and is spaced from axle 68 by a spacer 92. The ball race is located in the upper surface of bearing assembly 90 and is adapted to contact a corresponding track within support housing 62 and on a lower surface thereof. Thus, the weight of the vehicle is carried by the ball bearing assembly, the arrangement of which permits easy turning of axle 68. Various other bearing arrangements will be apparent to those skilled in the art.

The operation of the steering mechanism of the present invention is indicated in FIG. 5. When the vehicle is to move in a straight line, pivot bar 26 will be aligned with the longitudinal axis of the vehicle and thus will be generally parallel with the side walls 16 and 18. In this condition, the steering arms 52 and 72 will be aligned with the axis of the pivot bar and the axles 48 and 68 will be perpendicular to the pivot bar, as viewed in FIG. 5. When it is desired to turn the vehicle, the end portion of the pivot bar 26 which extends out of the body 10 and which carries the handle 24 is moved to one side or the other of the longitudinal axis of the vehicle. Movement of handle 24 toward side wall 16 causes the pivot bar to turn in a clockwise direction around its pivot pins 30, 32, as viewed in FIG. 5, thus moving the forward end of the pivot bar toward side wall 18. This movement of the pivot bar causes steering arm 52 to move in a clockwise direction about the axis defined by steering shaft 46, causing axle 48 to turn correspondingly in the manner illustrated in FIG. 5. At the same time, steering arm 72 is caused to rotate in a counterclockwise direction about the axis defined by steering shaft 66, as viewed in FIG. 5, thus causing axle 68 to swing in a direction opposite to the motion of axle 48. In a similar manner, movement of handle 24 toward side wall 18 will cause steering arm 52 to rotate in a counterclockwise direction and steering arm 72 to rotate in a clockwise direction, again as viewed in FIG. 5.

It will be apparent that with both axles swinging in opposite directions to effect a turn, the turn radius is considerably shorter than would be possible if only one axle assembly turned. The angle through which the axles swing will be determined by the length of the steering arms 52 and 72 and by the distance between the pivot axis of the steering bar 26 and the outer ends of the steering arms, and thus by the turning leverage available at the handle 24. Preferably, the pivot axis defined by pivot pins 30 and 32 is located approximately equidistant from the steering arm bearings 56 and 76, whereby pivoting of bar 26 results in an equal turning motion of the axle assemblies 20 and 22. Alternatively, the pivot axis may be located midway between the steering shafts 46 and 66, or at some other suitable location which may depend upon the relative swinging motion desired between axle assemblies 20 and 22 and upon the relative lengths of the corresponding steering arms 52 and 72. For simplicity and ease of manufacture, it is preferred that the mechanisms be made symmetrical, with the pivot axis centrally located between the steering arm bearings. It will be seen that the pivot bar need not extend beyond the end of the body portion of the vehicle, but may carry a handle which extends upwardly through a slot in the upper platform. Various additional methods of attaching a handle to the pivot bar may be devised without departing from the inventive concepts described and claimed herein.

Thus, there has been described a preferred embodiment of a steering mechanism for a two-axle vehicle such as a wagon, the mechanism being simple, economical to manufacture, easy to operate and sufficiently rugged to meet the requirements of continuous use which vehicles of this type must perform. Since various modifications of the preferred embodiment will be apparent to those skilled in the art, it is desired that the foregoing description be taken as illustrative and limited only by the following claims.

I claim:
1. In a steering mechanism for vehicle; first and second longitudinally-spaced axle assemblies mounted on said vehicle; each said axle assembly including an axle, a steering shaft for said axle, and a steering arm for said steering shaft, said steering arm being rotatable to thereby turn said axle; pivot bar means having a pivot axis between said axle assemblies; and means for connecting the steering arms of said axle assemblies to said pivot bar whereby rotation of said pivot bar about its pivot axis causes said axles to turn in opposite directions.

2. The steering mechanism of claim 1, wherein said steering arms connected to said pivot bar on opposite sides of said pivot axis.

3. The steering mechanism of claim 2, wherein one of said steering arms extends from its corresponding axle assembly toward said pivot axis, and the other of said steering arms extends from its corresponding axle assembly away from said pivot axis, whereby said steering arms rotate in opposite directions about their corresponding steering shafts upon rotation of said pivot bar about its pivot axis.

4. The steering mehanism of claim 3, wherein one end of said pivot bar carries a handle means for propelling or steering said vehicle or both.

5. The steering mechanism of claim 4, wherein said pivot bar is mounted on said vehicle by means of a pivot pin, said pivot pin defining said pivot axis.

6. The steering mechanism of claim 1, each said axle assembly further including a support housing for receiving said steering shaft and a mounting plate affixed to said housing for attaching said axle assembly to said vehicle, and bearing means for allowing relative rotational motion between said support housing and said steering shaft, said steering shaft extending between said axle and said steering arm whereby said steering arm, said axle, and said steering shaft are rotatable about an axis defined by said steering shaft.

7. The steering mechanism of claim 1, wherein said means for connecting said steering arms of said first and second bearing assemblies to said pivot bar comprises first and second channels on said pivot bar and bearing means on the outer end of each of said steering arms, said channels being adapted to receive the bearing means of corresponding steering arms.

8. The steering mechanism of claim 1, further including pivot plate means on said vehicle adapted to receive corresponding pivot pin means carried by said pivot bar, said pivot pin means defining said pivot axis.

9. The steering mechanism of claim 1, wherein said pivot bar extends generally longitudinally of said vehicle, said steering arms being parallel to said pivot bar and said axles being perpendicular to said pivot bar when said vehicle is traveling in a straight line, rotation of said pivot bar moving said steering arms in opposite directions out of parallel with said pivot bar to thereby swing said axles in opposite directions with respect to each other.

10. The steering mechanism of claim 9, wherein the pivot axis of said pivot bar is parallel to said steering shafts.

References Cited

UNITED STATES PATENTS

| | | | |
|---|---|---|---|
| 624,264 | 5/1899 | Thomas | 280—99 |
| 878,375 | 2/1908 | Gibbs | 280—95 |
| 949,774 | 2/1910 | Minnich | 280—47.11 |
| 1,131,050 | 3/1915 | Furrer | 280—98 |
| 1,133,838 | 3/1915 | Clarke | 280—99 |
| 1,625,421 | 4/1927 | Pearl | 280—102 |
| 2,191,184 | 2/1940 | Voorheis | 280—100 |
| 2,269,910 | 1/1942 | Naab | 280—47.11 |
| 2,701,143 | 2/1955 | Taylor et al. | 280—99 |
| 2,854,254 | 9/1958 | Quint | 280—101 |

KENNETH H. BETTS, Primary Eaminer

U.S. Cl. X.R.

280—100, 87.01

UNITED STATES PATENT OFFICE
CERTIFICATE OF CORRECTION

Patent No. 3,507,511       Dated April 21, 1970

Inventor(s) Lloyd E. Seidel

It is certified that error appears in the above-identified patent and that said Letters Patent are hereby corrected as shown below:

Claim 1, line 1, insert --a-- before "vehicle".

Claim 2, line 2, insert --are-- before "connected".

SIGNED AND SEALED
AUG 11 1970

(SEAL)
Attest:

Edward M. Fletcher, Jr.
Attesting Officer

WILLIAM E. SCHUYLER, JR.
Commissioner of Patents